(12) United States Patent
Lu et al.

(10) Patent No.: US 10,446,851 B2
(45) Date of Patent: Oct. 15, 2019

(54) NANOSTRUCTURED PEMFC ELECTRODE

(71) Applicant: FORD GLOBAL TECHNOLOGIES, LLC, Dearborn, MI (US)

(72) Inventors: Zijie Lu, Novi, MI (US); Jun Yang, Bloomfield Hills, MI (US); Mark S. Sulek, Sterling Heights, MI (US); Chunchuan Xu, Troy, MI (US); Kerrie K. Gath, Pittsfield, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 10 days.

(21) Appl. No.: 15/294,851

(22) Filed: Oct. 17, 2016

(65) Prior Publication Data

US 2018/0108919 A1    Apr. 19, 2018

(51) Int. Cl.
| | | |
|---|---|---|
| *H01M 4/92* | (2006.01) | |
| *H01M 4/86* | (2006.01) | |
| *H01M 8/1004* | (2016.01) | |
| *H01M 4/90* | (2006.01) | |
| *H01M 8/1018* | (2016.01) | |

(52) U.S. Cl.
CPC ......... *H01M 4/926* (2013.01); *H01M 4/8605* (2013.01); *H01M 4/8673* (2013.01); *H01M 4/9083* (2013.01); *H01M 8/1004* (2013.01); H01M 2008/1095 (2013.01)

(58) Field of Classification Search
CPC .. H01M 4/8817; H01M 4/926; H01M 4/9083; H01M 4/8605; H01M 8/1004; H01M 4/8673; H01M 2008/1095
See application file for complete search history.

(56) References Cited

U.S. PATENT DOCUMENTS

| | | | |
|---|---|---|---|
| 6,309,772 B1 * | 10/2001 | Zuber ................. | H01M 4/881 429/483 |
| 6,867,159 B2 | 3/2005 | Ebbrell et al. | |
| 2004/0197638 A1 | 10/2004 | McElrath et al. | |
| 2008/0193827 A1 * | 8/2008 | Jang ...................... | H01B 1/122 429/483 |
| 2010/0291467 A1 * | 11/2010 | Ji ........................ | B82Y 30/00 429/483 |
| 2014/0329165 A1 | 11/2014 | Haug et al. | |

\* cited by examiner

*Primary Examiner* — Milton I Cano
*Assistant Examiner* — Philip A. Stuckey
(74) *Attorney, Agent, or Firm* — David Kelley; Brooks Kushman P.C.

(57) ABSTRACT

An electrode for a fuel cell includes a catalyst layer adjacent to a gas diffusion layer and a proton exchange membrane, and ionomer-free active metal-loaded carbon nanostructures and active metal-free ionomer-coated carbon nanostructures arranged to define pores therebetween to facilitate transport of reactant gases and product water in the fuel cell.

16 Claims, 2 Drawing Sheets

NANOSTRUCTURED PEMFC ELECTRODE

TECHNICAL FIELD

The disclosure relates to a fuel cell electrode and a method of producing the same.

BACKGROUND

Fuel cells, such as proton exchange membrane fuel cells (PEMFC), represent an attractive source of electricity due to zero-emissions generation and increased energy security. Among the primary components of each fuel cell are two electrodes and an ion conducting electrolyte. The design of the electrodes requires delicate optimization of materials and production processes to ensure good conductance of gas, electrons, and protons such that the resultant electrode is efficient, not prone to flooding, and does not overly deteriorate during use. To improve its catalytic function, it is desirable to include an oxidation reduction reaction (ORR) catalyst onto the cathode. Yet, the catalyst may be expensive.

SUMMARY

In at least one embodiment, an electrode for a fuel cell is disclosed. The electrode includes a catalyst layer adjacent to a gas diffusion layer and a proton exchange membrane. The catalyst layer may include ionomer-free active metal-loaded carbon nanostructures and active metal-free ionomer-coated carbon nanostructures arranged to define pores therebetween to facilitate transport of reactant gases and product water in the fuel cell. The carbon nanostructures may be multi-wall carbon nanotubes. The active metal may be platinum or a platinum alloy including two or three different metals. The ionomer may be perfluorosulfonic acid. The ionomer may form a continuous coating on a surface of each ionomer-coated carbon nanostructure. The active metal loading of the catalyst layer may be about 3 to 60 wt. %. The ionomer to carbon nanostructure ratio may be about 5:1 to 1:5.

In another embodiment, a fuel cell unit is disclosed. The unit may include a bipolar plate, a gas diffusion layer adjacent to the plate, a proton exchange membrane, and a catalyst layer. The catalyst layer may be sandwiched between the gas diffusion layer and the proton exchange membrane. The catalyst layer may include a mixture of ionomer-free active metal-loaded carbon nanostructures and ionomer-coated active-metal-free carbon nanostructures. The carbon nanostructures may include nanotubes, nanofibers, or both. The nanostructures may define void spaces therebetween. The ionomer may be a proton conducting polymer. The active metal may be platinum or a platinum alloy. The length of the carbon nanostructures may be about 0.2 to 30 µm. The outer diameter of the carbon nanostructures may be about 10 nm to 300 nm.

In yet another embodiment, a method of forming a fuel cell electrocatalyst is disclosed. The method may include depositing an active metal on a first plurality of carbon nanostructures. The method may further include coating an ionomer solution on a second plurality of carbon nanostructures. The method may also include mixing the first and second pluralities to form an ink. The method may include applying the ink onto a proton exchange membrane to form a fuel cell electrocatalyst. The active metal may be deposited by physical vapor deposition. The method may further include mixing the second plurality with the ionomer solution and drying the ionomer-coated second plurality prior to the mixing of the first and second pluralities. The ionomer solution to carbon nanostructure ratio may be about 5:1 to 1:5. The platinum loading in the formed electrocatalyst may be about 0.03 to 0.3 mg/cm$^2$. The first and second pluralities may be each dispersed in a mixture of water and alcohol to form separate suspensions prior to mixing the first and second pluralities to form an ink.

DETAILED DESCRIPTION

Figure 1:
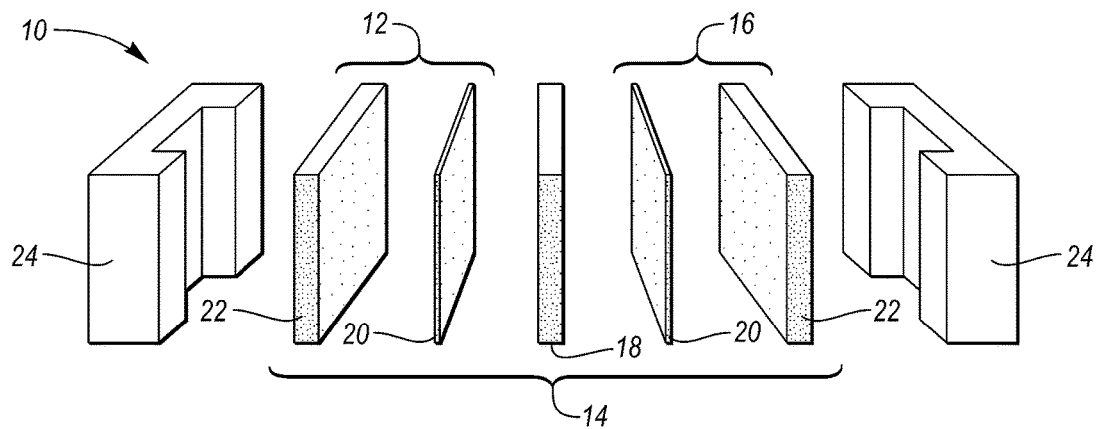
FIG. 1 depicts an exploded schematic view of an example fuel cell unit according to one or more embodiments.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Except where expressly indicated, all numerical quantities in this description indicating dimensions or material properties are to be understood as modified by the word "about" in describing the broadest scope of the present disclosure.

The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

The description of a group or class of materials as suitable for a given purpose in connection with one or more embodiments of the present invention implies that mixtures of any two or more of the members of the group or class are suitable. Description of constituents in chemical terms refers to the constituents at the time of addition to any combination specified in the description, and does not necessarily preclude chemical interactions among constituents of the mixture once mixed. The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

Fuel cells are devices converting chemical potential energy from a fuel, usually hydrogen, into electrical energy through a chemical reaction of the fuel with oxygen or another oxidizing agent. Fuel cells are capable of producing electricity as long as they have a continuous source of the fuel and oxygen. Many different types of fuel cells have been developed and are being utilized to power a plethora of different vehicles. Example types of fuel cells include PEM-FCs, phosphoric acid fuel cells (PAFCs), alkaline fuel cells (AFCs), solid oxide fuel cells (SOFCs), direct methanol fuel cells (DMFCs), molten carbonate fuel cells (MCFCs), etc.

Every fuel cell includes one or more stacks of individual units 10 having several components which are adjacent to each other. An example fuel cell unit 10 is depicted in FIG. 1 and includes an anode 12, a membrane electrode assembly (MEA) 14, and a cathode 16. An electrolyte is present, carrying electrically charged particles between the two electrodes 12, 16. Typically, MEA 14 includes a polymer electrolyte membrane (PEM) 18, two catalyst layers 20, and two gas diffusion layers (GDL) 22. The fuel cell unit 10 further includes an end or bipolar half-plate 24 on each side.

As a pressurized fuel enters the fuel cell on the anode side 12, the fuel undergoes oxidation reactions resulting in positively charged hydrogen ions and electrons. The positively charged hydrogen ions travel through the electrolyte while the electrons are forced to travel from the anode 12 to the cathode 16 via an external circuit, producing direct current electricity. If alternating current is needed, the direct current output may be routed through an inverter. Oxygen enters the cathode 16, combines with electrons returning from the electrical circuit and the hydrogen ions. Alternatively, depending on the type of electrolyte used, the oxygen combined with the electrons may travel through the electrolyte and combine with hydrogen ions at the anode 12. Regardless of the location where oxygen and hydrogen ions combine, together they form water, which is removed from the fuel cell.

The anode 12 and the cathode 16 each include a catalyst layer 20 facilitating the reactions of oxygen and hydrogen. At the anode 12 of a PEMFC, a catalyst oxidizes the fuel into the protons and electrons. The cathode catalyst catalyzes ORR which results in formation of water. The chemical reactions at the cathode 16 have a more complicated reaction mechanism than the reactions at the anode 12. As a result, the reactions at the cathode 16 are slow and require a substantial amount of catalyst to increase the speed of the reaction. A desirable catalyst must be sufficiently chemically active to be able to activate $O_2$, yet stable enough to withstand the corrosive environment at the cathode 16. Further still, the catalyst layer must be capable of facilitating release of product water from the catalyst surface to free up catalytic sites once the reaction is complete. Additionally, the catalyst must be selective enough to produce the desired product while minimizing production of undesirable intermediates. Thus, typically, the cathode 16 requires a higher catalyst loading than the anode 12.

Figure 2:
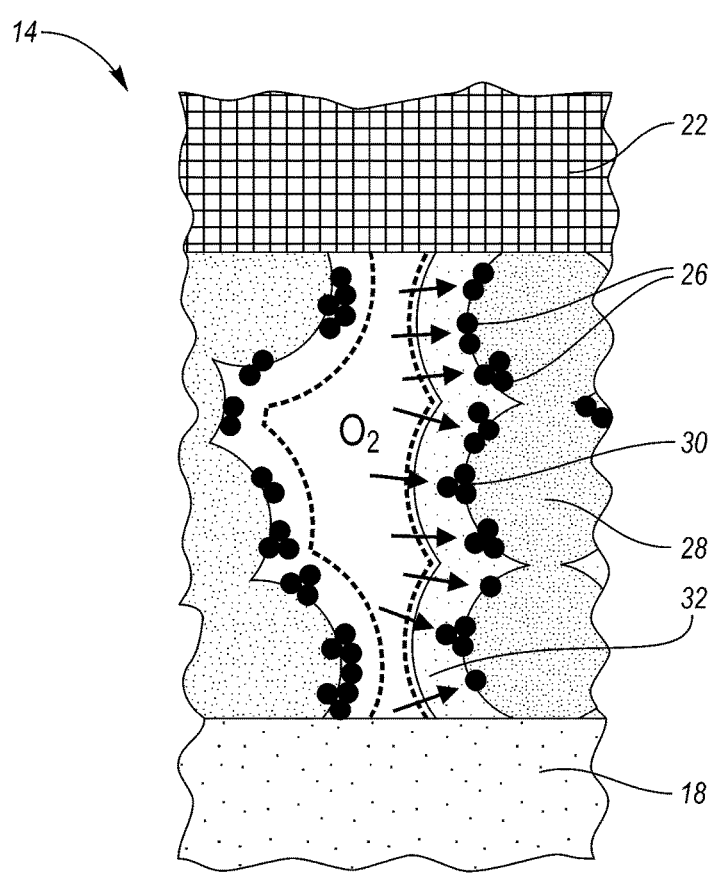
FIG. 2 depicts a schematic view of a prior art fuel cell electrode with a catalyst layer.

Additionally, a typical PEMFC electrode is manufactured by ink processing and includes platinum and carbon, or a platinum alloy and carbon nanoparticles, mixed with proton-conducting ionomers. As FIG. 2 illustrates, the electrocatalyst particles 26 loaded onto a carbon substrate 28 typically form agglomerates 30 which are surrounded by a thin layer of ionomer 32. Such electrode 14 structure represents a number of disadvantages. For example, the platinum utilization in the electrode is relatively low as the platinum nanoparticles tend to form the agglomerations 30. Such agglomerations 30 are responsible for the high electrocatalyst loading as at least some of the individual platinum atoms within the agglomerations are not being utilized. Additionally still, a high oxygen transport resistance is induced in the electrode because the oxygen molecules within the fuel cell need to permeate through the ionomer film 32 to reach the electrocatalyst sites 26. The ionomer film 32 thus presents an obstacle. Further, the local transport resistance through the ionomer film 32 increases with decreasing platinum loading, especially at less than 0.2 $mg_{Pt}/cm^2$.

Due to at least all of the reasons named above, if a noble metal such as platinum is used as a catalyst 26, the effective amount required may be financially demanding, and may be up to ten times higher at the cathode 16 than at the anode 12. While other materials may be used as a catalyst 26, platinum offers several advantages. For example, platinum is one of the few elements capable of withstanding the acidic environment of the fuel cell. On the cathode 16, platinum has the highest activity of all bulk metals. Platinum also helps prevent presence of free $H_2O_2$ which may be otherwise highly damaging in the fuel cell environment.

Additionally, at the anode 12, platinum oxidizes hydrogen gas faster at any given potential than other catalyst materials. Metals having weaker interactions with hydrogen gas are less efficient as the adsorption of hydrogen gas to the metal. On the other hand, metals which may bind hydrogen to the metal too strongly may not efficiently release the electrons and the positively charged hydrogen ions.

Thus, it would be desirable to utilize platinum, but reduce the cost of the electrocatalyst, and thus the cost of the fuel cell. To help achieve such goal, providing an electrode with a low or ultra-low platinum loading of about 0.1 $mg_{Pt}/cm^2$ and having high platinum utilization while also having minimal transport resistance would be useful.

Figure 3:
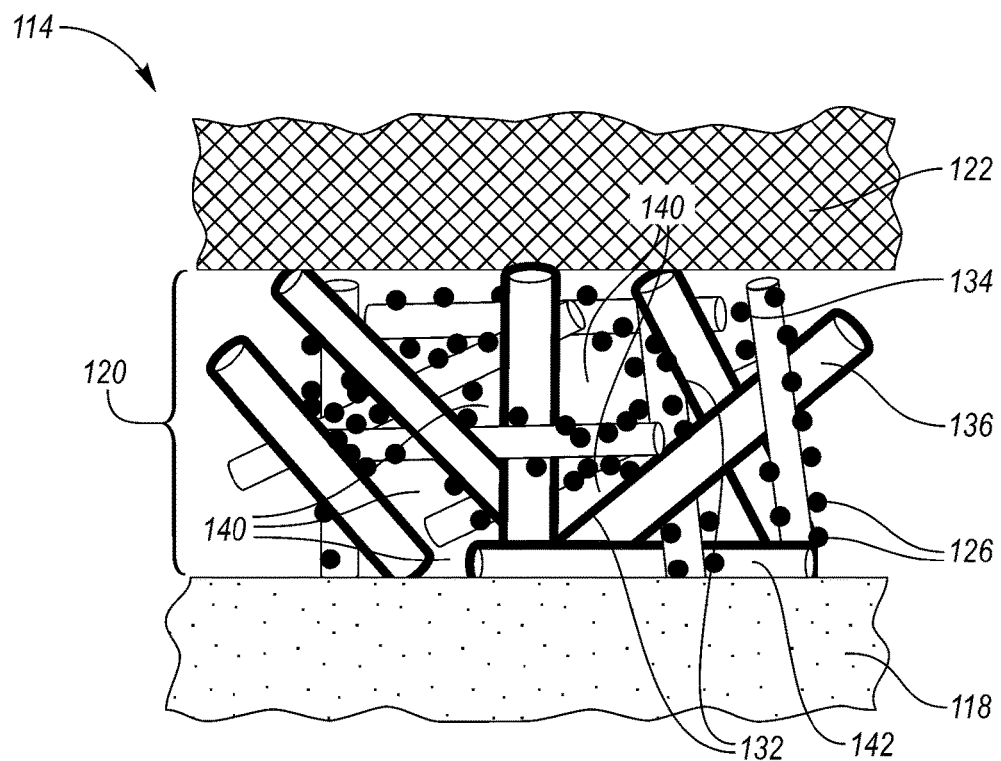
FIG. 3 depicts a schematic view of a fuel cell electrode having a catalyst layer including two types of nanostructures according to one or more embodiments.

The embodiments of the current disclosure overcome one or more above-named disadvantages. In one or more embodiments, a fuel cell electrode having a catalyst layer 120 is disclosed. As is depicted in FIG. 3, the catalyst layer 120 includes at least two different types of nanostructures. The first type represents ionomer-free nanostructures 134 loaded with an electrocatalyst 126. The second type is active metal-free nanostructures 136 coated with an ionomer 132. Together, the nanostructures 134 and 136 form the catalyst layer 120 and are arranged to define pores 140 therebetween.

The nanostructures 134, 136 may be carbon-based. The nanostructures 134, 136 may contain the same or different base material 142. The base material 142 may be any base material capable of providing support for the electrocatalyst 126 in nanostructures 134, capable of binding ionomer in nanostructures 136, or both. The base material 142 is suitable for a fuel cell. The base material 142 may be a carbon fiber support. The base 142 may be a composite support such as graphite, carbon nanofibers, macromolecules, the like or a combination thereof. The base 142 may include one or more members of the fullerene structural family such as carbon nanotubes, nanospheres (bucky-balls), nanoellipsoids, the like, or a combination thereof. The base 142 may include a honeycomb lattice structure or a three-dimensional graphene material having periodic and nonperiodic honeycomb-like portions. The base material 142 may include graphene flakes. The base material 142 may include a network of carbon fibers.

The base material 142 may be formed by carbon nanotubes. Each nanotube features a hollow structure with the walls formed by graphene, an allotrope of carbon in the form of a two-dimensional, atomic-scale, honeycomb lattice in which one atom forms each vertex. The carbon nanotubes represent seamless cylindrical hollow fibers. The nanotubes include a hexagonal lattice of covalently bonded carbon atoms having a regular arrangement of carbon atoms within the lattice. The carbon nanotubes thus form straw-like cylinders of pure carbon. The nanotubes may be single-walled or multi-walled. Additionally, the nanotubes may be arranged into a variety of structures. Exemplary structures may include a nanobud combining nanotubes with fullerenes, a carbon torus referring to a carbon nanotube bent into a doughnut shape, graphitized carbon nanotubes combining graphitic foliates grown along the sidewalls of multi-walled nanotubes, a carbon peapod referring to a carbon nanotube with a trapped fullerene inside, cup-stacked carbon nanotubes having a stacked microstructure of graphene layers, the like, or a combination thereof. The multi-walled nanotubes are made of coaxial cylinders having interlayer spacing close to that of the interlayer distance in graphite which is about 0.34 nm (3.4 Å). An example structure of the multi-walled nanotube may include a Russian nesting doll model referring to a set of concentric nanotubes of decreasing diameter placed one inside another or a parchment model referring to a nanotube sheet arranged as a partially unrolled scroll. The nanotubes may be capped with half of a fullerene molecule. The nanotubes may have an inner diameter of about 5 nm to 100 nm, 1 nm to 50 nm, or 0.7 nm to 30 nm. The nanotubes may have an outer diameter of about 10 nm to 300 nm, 20 nm to 250 nm, or 50 nm to 150 nm. The band gap may be about 0-2 eV. The nanotubes may have a length of about 0.2 to 30 µm, 0.5 to 20 µm, or 1 to 10 µm.

In addition, other materials may be used as a base material 142 for the nanostructures 34, 36, or both. For example, the base material 142 of the nanostructures 136 may include conductive oxides such as tin oxide, indium tin oxide, titanium oxide, tungsten oxide; carbides such as tungsten carbides, boron carbide; or conductive doped diamonds and nanodiamonds; or even a non-conducting polymer such as perylene red or a mixture of non-conducting polymers; or a combination thereof The nanostructures 134 are loaded with active metal having a function of an electrocatalyst 126. The electrocatalyst particles 126 provide the ORR catalytic function. The electrocatalyst particles 126 may be platinum, platinum alloys such as binary platinum alloys, for example Pt—Co, Pt—Ni, Pt—Au, Pt—Pd, or the like, ternary platinum alloys such as PtPdCo, PtCoMn, or the like, platinum oxides, or a combination thereof. The platinum alloys may be a combination of platinum and any element formed into nanoparticles with controllable size as long as the electrocatalyst particles 126 retain their catalytic activity. The alloying element may be less expensive than platinum to reduce the electrocatalyst cost. Desirable alloying materials provide access of the platinum atoms to the surface of the alloyed particles such that platinum is available to promote the key reactions in the fuel cell. Example elements may include yttrium, carbon, cobalt, manganese, rhodium, ruthenium, gold, niobium, titanium, tantalum, molybdenum, tungsten, iridium, the like, or their combination.

Alternatively, the electrocatalyst 126 may be a non-platinum catalyst and instead contain a different active metal such as palladium to further reduce the cost of the fuel cell electrode. As such, the electrocatalyst particles 126 may include about 0% to 100% platinum, 15% to 70% platinum, or 20% to 50% platinum.

The size of the electrocatalyst particles 126 may be from about 1 nm to 15 nm, 2 nm to 9 nm, or 5 nm to 7 nm in diameter. The size of the electrocatalyst particles 126 has to be sufficient to provide active surface area large enough to sustain electrochemical activity. The electrocatalyst particles 126 may be capable of producing from up to 250 A of electric current/g of platinum. The density of the electrocatalyst particles 126 deposited onto the nanostructures 134 may be from about 0.05 to 50 wt. %, 5 to 40 wt. %, or 10 to 30 wt. % mg/cm$^2$. The electrocatalyst 126 loading in the catalyst layer may be from about 0.02 mg/cm$^2$ to 1 mg/cm$^2$, 0.05 mg/cm$^2$ to 0.6 mg/cm$^2$, or 0.05 mg/cm$^2$ to 0.3 mg/cm$^2$. The electrocatalyst 26 may be evenly or unevenly distributed on the nanostructures 134.

The nanostructures 136 contain an ionomer 132. The ionomer 132 may be applied by coating, impregnation, dipping, spraying, printing, brushing, spin coating, or in any other suitable manner. The ionomer 132 may be applied as one or more layers onto the nanostructures 136. The ionomer 132 may coat the entire surface of each nanostructure 136. Alternatively, at least a portion of at least one nanostructure 136 may be free from the ionomer 132. The ionomer 132 may be any proton conducting polymer or a mixture of more than one proton conducting polymers. Example ionomers 132 may include one or more perfluorsulfonic acids, sulfonated hydrocarbon polymers, fluorocarbons, or the like. The ionomer 132 may be long side-chain PFSA (Gore high equivalent weight ionomer), short side-chain PFSA (Solvay Aquivion), or perfluoroimide acid. The amount of ionomer 132 may be from about 0.1 to 5.0 mg/cm$^2$. The ratio of the ionomer 132 to the base material 142 of the carbon nanostructure 136 may be about 20:1 to 1:20, 5:1 to 1:5, 3:1 to 1:3, or 2:1 to 1:2. The nanostructures 134 and 136 form a catalyst layer 120.

Figure 4:
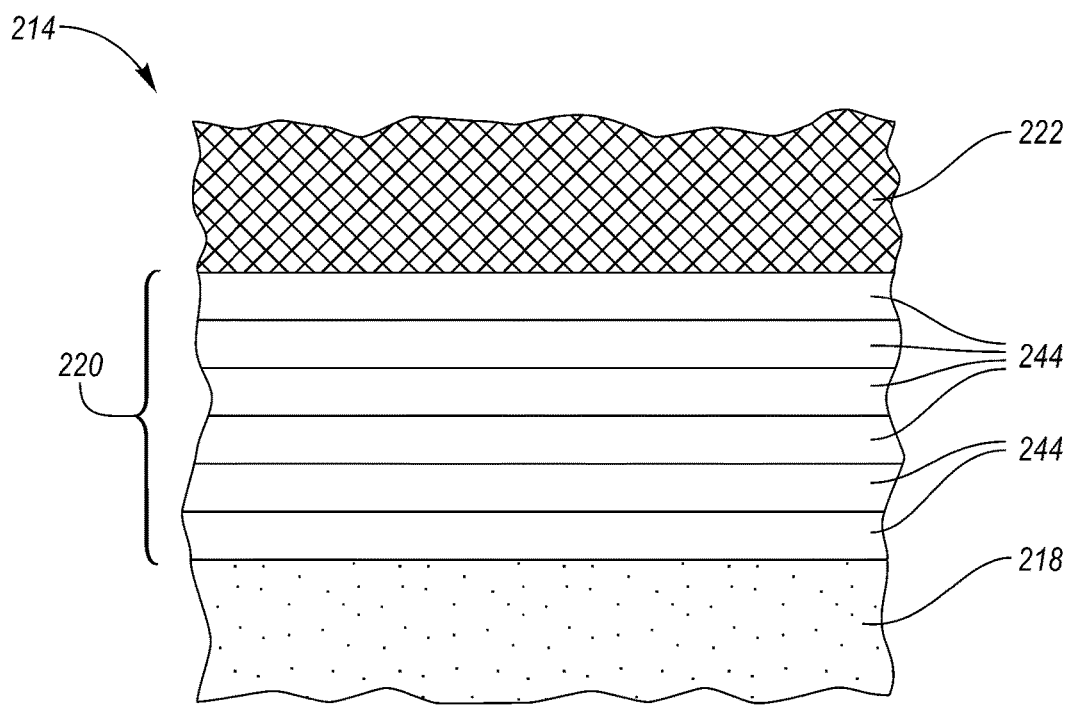
FIG. 4 shows an alternative embodiment of a fuel cell electrode with a catalyst layer having a plurality of sublayers.

In one or more embodiments, depicted in FIG. 4, a catalyst layer 220 may contain one or more sublayers 244, each sublayer 244 containing both ionomer-free active metal-loaded carbon nanostructures and active metal-free ionomer-coated carbon nanostructures, as was described above. The amount of sublayers 244 may be from about 1 to 100, 2 to 50, or 5 to 10. Each sublayer 244 may contain a different ratio of the ionomer-free active metal-loaded carbon nanostructures to the active metal-free ionomer-coated carbon nanostructures. For example, the ratio of the ionomer-free active metal-loaded carbon nanostructures to the active metal-free ionomer-coated carbon nanostructures may be 1:1 in the middle sublayers 244. Yet, the ratio may be different in the sublayers 244 closer to the PEM 218 and the GDL 222. Example ratios of the ionomer-free active metal-loaded carbon nanostructures to the active metal-free ionomer-coated carbon nanostructures may be varied in different sublayers. For example, the sublayers 244 closest to the PEM 218 may contain higher amount of the ionomer-coated nanostructures than the ionomer-free nanostructures while the sublayers 244 closest to the GDL 222 may contain higher amount of the active metal-loaded nanostructures than the active metal-free nanostructures, or vice versa.

The nanostructures 134 and 136 are mixed together to form the catalyst layer 120. The ionomer-free active metal-loaded nanostructures 134 provide high electrical conductivity and high stability for the electrocatalyst 126. The active metal-free ionomer-coated nanostructures 136 provide high proton conductivity. When mixed, applied, and during utilization of the fuel cell, the nanostructures 134 remain ionomer-free and the nanostructures 136 remain active metal-free. The respective high electrical and proton conductivity is also preserved. Additionally, since the coverage of platinum by the ionomer 132 is mostly prevented, high platinum utilization and reduced oxygen transport resistance of the electrode 114 are expected. The nanostructures 134 and 136 within the mixture may be randomly oriented, stacked, intertwined, interlaced. Any two nanostructures 134, 136, or both may be perpendicular or parallel to each other, or be oriented at any angle between 0° to 180° towards each other. The arrangement of the nanostructures 134, 136 forms voids, gaps, or pores 140 therebetween. The pores 140 may take up to about 10 to 70 vol. %, 20 to 50 vol. %, or 30 to 40 vol. % of the catalyst layer. The pores 140 may facilitate transport of reactant gases and product water in the fuel cell.

The disclosure provides a method of producing the catalyst layer 120. The method includes preparation of at least two different sets of nanostructures 134 and 136, as described above. The base material 142 may be functionalized. The base material 142 may be mixed with a concentrated strong acid such as $HNO_3$ and stirred for about 1 to 10 hours, 2 to 6 hours, or 4 to 5 hours at a temperature of about 75° C. to 350° C., 100° C. to 200° C., or 120° C. to 180° C. at 100 to 500 rpm, 200 to 400 rpm, or 250 to 300 rpm. The mixture may be filtered and rinsed with nanopure water afterwards.

A first portion or plurality of the filtered and rinsed nanostructure mixture may be loaded with an active metal to form the ionomer-free active metal-loaded nanostructures 134. The active metal may be deposited by a chemical wet method or by vacuum deposition methods such as cathodic arc deposition, electron beam physical vapor deposition, sputter deposition including pulse DC sputtering, DC sputtering, radiofrequency sputtering, and ion-specific sputtering, evaporative deposition, and pulsed laser deposition.

A second portion of the filtered and rinsed nanostructure mixture may be coated with an ionomer 132 to form the active metal-free ionomer-coated nanostructures 136. The nanostructure mixture and the ionomer 132 may be mixed in a desirable ratio of the ionomer to the nanostructure mixture of about 5:1 to 1:5, 3:1 to 1:3, or 2:1 to 1:2 in a solvent such as an alcohol. The formed mixture may be ultrasonicated in iced water for about 30 minutes to 5 hours, 1 hour to 3 hours, or 1.5 hours to 2 hours. The formed mixture may be subsequently dried at about an ambient temperature (about 22 to 25° C.) to 100° C., 30° C. to 90° C., or 50° C. to 80° C. until the solvent is completely removed.

The ionomer-free active metal-loaded nanostructures 134 may be dispersed in a mixture of water and solvent to form a first suspension. The water to solvent ratio may be about 8:1 to 1:8, 6:1 to 1:6, or 3:1 to 1:3. The dispersion may be ultrasonicated for about 30 minutes to 5 hours, 1 hour to 3 hours, or 1.5 hours to 2 hours. Likewise, the active metal-free ionomer-coated nanostructures 136 may be dispersed in the same manner as the nanostructures 134 to form a second suspension. The first and second suspensions may be mixed. The mixed suspensions may be ultrasonicated in iced water for about 5 minutes to 3 hours, 15 minutes to 2 hours, or 20 minutes to 1 hour. No ionomer is being added to the mixture of the first and second suspensions. The ultrasonicated suspensions form an ink. The ink may be immediately applied onto the PEM 118 surface, the GDL 122 surface, or both. The ink may be dried at the ambient temperature (about 22 to 25° C.) or at a higher temperature. The fuel cell catalyst layer 120 is thus formed.

Alternatively, more than one type of nanostructures 134 and/or 136 may be formed by the method described above. For example, at least two different types of nanostructures 134, 136 each may be formed. The types may differ by catalyst loading, dimensions of the base material, type of the base material, ratio of the base material to the ionomer, and/or by other properties.

The method may also include repeating the above-mentioned method steps such that multiple sublayers 244 are formed. The sublayers 244 may be the same or differ by catalyst loading, dimensions of the base material, type of the base material, ratio of the base material to the ionomer, and/or by other properties. For example, a first sublayer 244 may contain carbon nanotubes loaded with about 10 wt. % of platinum and ionomer-coated carbon nanotubes. The ratio of the nanostructures 134 to 136 may be 3:1. A second sublayer 244 may contain carbon fibers loaded with a platinum alloy at about 20 wt. % and ionomer-coated carbon nanotubes, where the ratio of the ionomer to the carbon base material is 1:1. A third sublayer 244 may contain a mixture of single- and multi-walled nanotubes loaded with about 30 wt. % of platinum and platinum alloys and a non-conducting organic polymer coated with an ionomer.

The arrangement of the formed sublayers 244 may be random. Alternatively, the sublayers 244 may be designed specifically to deliver enhanced function of the catalyst layer 220. For example, the sublayers 244 may be arranged such that the ionomer content within the catalyst layer 220 gradually decreases in a direction away from the PEM 218 (i.e. in the direction towards the GDL 222), or vice versa. Similarly, the sublayers 244 may be arranged such that the catalyst loading increases or decreases in a certain direction.

The fuel cell electrodes 114, 214 disclosed herein thus have at least the following advantages. Due to the reduction of the ionomer coverage on platinum, the catalyst has high active metal utilization and high mass activity. Oxygen transport resistance through the ionomer film is reduced. The morphology of the ionomer-coated nanostructures ensures high proton conductivity while the ionomer-free nanostructures provide high electron conductivity and stability for the electrocatalyst. The pores formed between the mixed nanostructures may facilitate transport of reactant gasses and product water. Moreover, the catalyst layer may be easily fabricated using ink processing, for example, which simplifies production of the entire fuel cell electrode.

EXAMPLE AND COMPARATIVE EXAMPLES

Example 1 was prepared by functionalizing graphitized multi-walled carbon nanotubes having an outer diameter of 10-20 nm, length of 10-30 μm, and 99.9% purity. Functionalization was provided by mixing the nanotubes with concentrated $HNO_3$ and stirred at 250 rpm at 120° C. for 5 hours. The mixture was filtered and thoroughly rinsed with nanopure water. The mixture was divided to a first portion and a second portion in the ratio of 1:1.

The first portion was platinized. Platinum was deposited on the surface of the functionalized nanotubes from a platinum precursor (hexachloroplatinic acid) with a wet chemical method (colloidal approach). The platinized carbon nanotubes were rinsed thoroughly with nanopure water, filtered with 5 μm polycarbonate filter paper, and then dried in a vacuum desiccator. Platinum loading was in the range of 15 to 20 wt. %.

The second portion was mixed with Aquivion D83-06A solution in a ratio of the ionomer to the nanostructures of 2:1 in isopropanol. The mixture was ultrasonicated in iced water for 1 hour and subsequently dried at about 80° C. until the solvent was completely removed.

The platinized nanotubes were dispersed in water and isopropanol mixture having a ratio of 4:1 water:solvent for 1 hour to form a first suspension. The nanotubes coated with ionomer were dispersed in water and isopropanol mixture having a ratio of 4:1 water:solvent for 1 hour to form a second suspension. The first and second suspensions were mixed and ultrasonicated in iced water for about 15 minutes to from an ink. The ink was immediately applied onto a RDE electrode and dried in situ.

Each Comparative Example A and B, respectively, was prepared as follows. In Example A, a mixture of platinum-loaded multi-walled carbon nanotubes, multi-walled carbon nanotubes, an ionomer solution of Aquivion D83-06A, and 4:1 nanopure water:isoproponal was prepared to from a suspension. The platinum loading and contents of the multi-walled carbon nanotubes and ionomer, as well as solids percentage, were kept the same as for Example 1. The formed suspension was ultrasonicated in iced water for 1 hour to form an ink. The ink was immediately applied onto a RDE electrode and dried in situ. In Example B, a mixture of platinum on carbon (TKK TEC10EA50E with 46.4 wt. % Pt), Aquivion D83-06A ionomer, and 4:1 water:isoproponal was prepared to form a suspension. The platinum loading and contents of carbon and ionomer, as well as solids percentage, were kept the same for Example 1 and Comparative Example A.

The results are provided in the Table 1 below. As can be seen from Table 1 below, Example 1 has higher electrochemical surface area (ECSA) than Comparative Example A which indicates that more platinum nanoparticles are active because they are not covered by the ionomer thin film as in Comparative Example A. Example 1 also shows higher ORR current at 0.4V than Comparative Example A and than both Comparative Examples A and B at 0.9V. The higher ORR current of Example 1 may imply smaller oxygen transport resistance in the catalyst layer because the active reaction site is not covered by the ionomer film. Furthermore, Example 1 shows higher beginning of life (BOL) Specific Activity than Comparative Example B and higher BOL Mass Activity than both Comparative Examples A and B.

TABLE 1

Comparison of catalytic properties of Example 1 and Comparative Examples A and B

| | Example or Comparative Example | | |
| --- | --- | --- | --- |
| | Example 1 (Ionomer/ Carbon ratio in the catalyst layer = 1) | Comparative Example A (Ionomer/ Carbon ratio in the catalyst layer = 1) | Comparative Example B (Ionomer/ Carbon ratio in the catalyst layer = 1) |
| Electrochemical surface area ECSA [$m^2/g$] | 35.26 | 26.23 | 54.33 |
| ORR current at 0.4 V [mA] | 1.13 | 1.06 | 1.17 |
| ORR current at 0.9 V [mA] | 0.46 | 0.39 | 0.34 |
| BOL Specific Activity [$mA/cm^2$] | 0.73 | 0.78 | 0.29 |
| BOL Mass Activity [$A/g_{Pt}$] | 259.02 | 205.50 | 157.86 |

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. An electrode for a fuel cell comprising: a catalyst layer adjacent to a gas diffusion layer and a proton exchange membrane, and including a mixture of ionomer-free active metal-loaded carbon nanostructures and active metal-free ionomer-coated carbon nanostructures arranged to define pores therebetween to facilitate transport of reactant gases and product water in the fuel cell
   wherein the ionomer-free active metal-loaded carbon nanostructures and the active metal-free ionomer-coated carbon nanostructures are multi-wall concentric cylinder carbon nanotubes.

2. The electrode of claim 1, wherein the active metal is platinum or a platinum alloy including at least one of yttrium, rhodium, gold, niobium, titanium, tantalum, molybdenum, tungsten, and iridium.

3. The electrode of claim 1, wherein the ionomer includes perfluorosulfonic acid and/or at least one of a sulfonated hydrocarbon polymer and a fluorocarbon.

4. The electrode of claim 1, wherein the ionomer forms a continuous coating on a surface of less than all ionomer-coated carbon nanostructures.

5. The electrode of claim 1, wherein the active metal loading of the catalyst layer is about 0.02 $mg/cm^2$ to 1 $mg/cm^2$.

6. The electrode of claim 1, wherein the ionomer to a base material of the active metal-free ionomer-coated carbon nanostructure ratio is about 20:1 to 1:20.

7. The electrode of claim 1, wherein an outer diameter of the active metal-free ionomer-coated carbon nanostructures is about 10 nm to 300 nm.

8. The electrode of claim 1, wherein the catalyst layer forms a plurality of sublayers containing a different ratio of the ionomer-free active metal-loaded carbon nanostructures to the active metal-free ionomer-coated carbon nanostructures.

9. The electrode of claim 8, wherein a sublayer closest to the proton exchange membrane contains a higher amount of the active metal-free ionomer-coated nanostructures than the ionomer-free active metal-loaded nanostructures.

10. The electrode of claim 8, wherein a sublayer closest to the gas diffusion layer contains a higher amount of the ionomer-free active metal-loaded nanostructures than the active metal-free ionomer-coated nanostructures.

11. An electrode for a fuel cell comprising: a catalyst layer having a mixture of at least two types of different nanostructures including first ionomer-free metallized carbon nanostructures and second metal-free ionomer-coated carbon nanostructures, the first and second nanostructures being arranged as discreet nanostructures in the mixture to define a plurality of pores therebetween to facilitate transport of reactant gases and product water in the fuel cell,
   wherein first ionomer-free metallized carbon nanostructures and second metal-free ionomer-coated nanostructures are multi-wall carbon nanotubes.

12. The electrode of claim 11, wherein the ionomer forms a continuous coating on a surface of each metal-free ionomer-coated carbon nanostructure.

13. The electrode of claim 11, wherein the first ionomer-free metallized carbon nanostructures include platinum or a platinum alloy.

14. The electrode of claim 11, wherein a ratio of the first nanostructures to the second nanostructures is 3:1.

15. The electrode of claim 11, wherein a metal loading of the catalyst layer is about 3 to 60 wt. %.

16. The electrode of claim 11, wherein the plurality of pores takes up to about 10 to 70 vol. % of the catalyst layer.

* * * * *